US009672546B2

(12) United States Patent
Jagyasi (10) Patent No.: US 9,672,546 B2
(45) Date of Patent: Jun. 6, 2017

(54) ACCURATE AND INSTANTANEOUS COMMODITY PRICING INFORMATION SYSTEM

(75) Inventor: Bhushan Gurmukhdas Jagyasi, Mumbai (IN)

(73) Assignee: Tata Consultancy Services Limited, Maharashtra (IN)

( * ) Notice: Subject to any disclaimer, the term of this patent is extended or adjusted under 35 U.S.C. 154(b) by 0 days.

(21) Appl. No.: 13/591,562

(22) Filed: Aug. 22, 2012

(65) Prior Publication Data

US 2013/0054308 A1 Feb. 28, 2013

(30) Foreign Application Priority Data

Aug. 24, 2011 (IN) .......................... 2380/MUM/2011

(51) Int. Cl.
*G07F 19/00* (2006.01)
*G06Q 30/06* (2012.01)
(52) U.S. Cl.
CPC .................................... *G06Q 30/06* (2013.01)
(58) Field of Classification Search
CPC ........................................................ G06Q 30/06
USPC .............................. 705/7.34; 701/532, 32.4
See application file for complete search history.

(56) References Cited

U.S. PATENT DOCUMENTS

| | | | |
|---|---|---|---|
| 6,073,075 A * | 6/2000 | Kondou et al. ................ | 701/516 |
| 2001/0004475 A1 | 6/2001 | Allen | |
| 2007/0050275 A1 * | 3/2007 | Hunsicker ....................... | 705/35 |
| 2007/0143013 A1 * | 6/2007 | Breen ............................ | 701/211 |
| 2008/0097916 A1 | 4/2008 | Shen | |
| 2008/0114540 A1 * | 5/2008 | Nagel ............................ | 701/208 |
| 2008/0125142 A1 * | 5/2008 | Chang-Hung .............. | 455/456.6 |
| 2008/0306821 A1 * | 12/2008 | Fell et al. ......................... | 705/14 |
| 2009/0080635 A1 * | 3/2009 | Altberg et al. ........... | 379/216.01 |
| 2010/0211244 A1 * | 8/2010 | Jeong et al. ..................... | 701/25 |
| 2011/0099048 A1 * | 4/2011 | Weiss et al. .................. | 705/7.34 |
| 2011/0106721 A1 * | 5/2011 | Nickerson et al. ........... | 705/347 |

(Continued)

OTHER PUBLICATIONS

Ahmadi, Salman, M. J. Zoej, Hamid Ebadi, Hamid Abrishami Moghaddam, and Ali Mohammadzadeh. "Automatic urban building boundary extraction from high resolution aerial images using an innovative model of active contours." International Journal of Applied Earth Observation and Geoinformation 12, No. 3 (2010): 150-157.*

*Primary Examiner* — Jonathan G Sterrett
*Assistant Examiner* — Mehmet Yesildag
(74) *Attorney, Agent, or Firm* — Hayes Soloway PC (57) ABSTRACT

The present invention relates to collecting and dissemination of exact and instantaneous commodity pricing information of any market from remote locations with the help of individuals present in the market by utilizing localization application loaded in their mobile phones or base station. The current prices undertaken by individuals in the market is updated in a centralized commodity database which can be queried from any remote location using mobile phone or remote computer over internet. The presence of the information provider is determined by approximating contours of the target premises which minimizes the memory required to store information in the mobile phone. In an alternative embodiment, the instantaneous price information is obtained by connecting electronic transaction payment system with the central commodity database.

18 Claims, 3 Drawing Sheets

(56) References Cited

U.S. PATENT DOCUMENTS

2012/0072533 A1\* 3/2012 O'Neil ........................ 709/217
2012/0221502 A1\* 8/2012 Jerram et al. .................. 706/46
2012/0246004 A1\* 9/2012 Book et al. ................ 705/14.58
2012/0330721 A1\* 12/2012 Volpe et al. ................. 705/7.32
2012/0330722 A1\* 12/2012 Volpe et al. ................. 705/7.32

\* cited by examiner

ACCURATE AND INSTANTANEOUS COMMODITY PRICING INFORMATION SYSTEM

FIELD OF THE INVENTION

The present invention relates generally to methods and systems for providing real time commodity pricing information at remote location, and more particularly for determining real time accurate pricing information for a commodity within a geographical boundary.

BACKGROUND OF THE INVENTION

The gathering of pricing information of a commodity in a real time environment is a challenging task, particularly when numerous individual retailers are present in one particular area defined by a geographical boundary. The prices of commodities under such market conditions tend to fluctuate in an unpredictable manner, rather more abysmally on a daily and hourly basis.

Most of the time, the consumer may be interested in assessing the prices prevailing in a commodity market or in any other convenient market of a nearby location or elsewhere, without he actually visiting the market for such enquiries. Moreover, it might be difficult for him to find the most accurate and instant prices of a commodity, in case he decides to interrogate each vendor individually. The problem is further accentuated if the consumer is checking out the most attractive pricing option; probably because of frequent, volatile, and asynchronous price fluctuations that can occur between the time the prices are observed and the time that the purchase is consummated. One of the other major reasons can be his remote location from a market or his engagement with other relevant tasks or work schedules, traffic, distance etc.

From the perspective of both consumer and the retailer, amidst the dearth of time or looking at his convenience or other subjective factors, it is desirable to provide commodity relevant information without the consumer having to visit the market.

US Patent Application 2007/0050275 describes method to purchase commodity at a low price. Here commodity prices are gathered periodically (may be daily) and the information is updated in the database which leads to the determination of lowest price commodity provider by gathering price details through a computer network.

US Patent Application 2001/0044755 is a trial purchase system which leads to the experience of the commodity purchase procedure that considers computer terminals for information gathering.

US Patent Application 2008/0097916 on "method of collecting and distributing information and sorting by bid price" details a method to advertise the commodity which also facilitates ease in bid price sorting. The system includes a barcode reader and a wireless communication device along with information inputting, storing and sorting system to solve the problem of sorting and advertising of bidding prices.

However, the limitations observed with regard to the above cited arts are—availability of only the statistical information; periodic availability of pricing information (with a delay of a day); requiring a scout to personally visit the market for price collection and maintenance in a database; limitation of retrieving not much accurate, instant and exact information; and ignoring the quality pertaining information of a commodity while collecting the commodity relevant information.

In the light of foregoing limitations, there seems a long-felt, but unresolved need for a system that enables gathering of instant and accurate commodity relevant information at reduced expenses. The need for a system, allowing better exchange of such information via effective communication mode without having to travel to the target market, is what is ardently required.

OBJECT OF THE INVENTION

In accordance with the present invention, a viable solution for determining real time pricing information of the commodity at remotely located market having a geographical boundary is provided.

It is an object of the present invention to provide a system and method that is capable of storing the real time pricing and other commodity relevant information in a central commodity database.

Another object of the present invention is to avail the exact and most accurate pricing information directly from the individuals dealing in the market premises.

It is an object of the invention to allow capturing of images or videos of the commodity being enquired to enable the consumer adjudge the pricing and quality aspect of the "to be purchased" or "to be sold" commodity.

One of the other objects of the present invention is to provide a platform of advertisement to the vendors, with minimum price and best quality.

Yet another object of the present invention is to enable the consumers decide upon the most attractive price of the commodity by enquiring numerous vendors located disparately and offering variable prices.

In accordance with the aspect of the invention, the system is capable of identifying trustworthy individuals entrusted with the task of providing credible information for providing exact, instant and accurate information to the consumers by way of rewarding incentives.

In another aspect of the present invention, the system allows accessing the commodity relevant information from a remote location without actually having to visit the market premises.

In yet another aspect of the present invention, the proposed system and method is simple to implement and obviates extensive data analysis for arriving at product pricing information in a real time.

SUMMARY OF THE INVENTION

Briefly described and according to one embodiment, the present invention provides a system and method of collecting and disseminating commodity pricing information with the help of human participation over telecommunication methods. The invention enables access to exact and instantaneous commodity pricing information of any market from remote locations with the help of individuals present in the market by utilizing localization application loaded in their mobile phones or a base station. The current prices undertaken by individuals in the market is updated in a centralized commodity database which can be queried from any remote location using mobile phone or remote computer over internet.

In accordance with one of the aspects of the present invention, a method for providing a real time commodity relevant information over a communicating network to the information seekers is enumerated, the method comprising:

detecting one or more information provider present in one or more target premises by using plurality of contour coordinate information associated with the target premises;

transmitting "of interest" information to the detected information providers for motivating their participation in generating, gathering and communicating the real time commodity relevant information;

aggregating the real time commodity relevant information for disseminating an accurate information;

storing and updating an aggregated information in real time from the information providers in a central commodity database; and providing the real time commodity relevant information from the central commodity database or the information providers detected in the target premises or a combination thereof to the information seeker.

Another aspect of the present invention provides a method for providing real time commodity relevant information over a network, the network communicating with a central commodity database, the method comprising:

aggregating real time commodity relevant information from one or more information providers present in one or more target premises;

assigning a weighted score to a tuple comprising of the information providers, aggregated commodity information and the target premises;

maintaining and updating a central commodity database comprising profile data of one or more information provider and the weighted score of the corresponding tuple;

querying the central commodity database of real time commodity relevant information based on the profile data of the information provider; and providing the real time commodity relevant information from the central commodity database based on a comparison between the weighted score and a predetermined threshold value to one or more information seekers.

Yet another aspect of the invention provides a system for providing real time commodity relevant information over a communicating network, the system comprising:

a means for detecting and communicating with one or more information provider present in one or more target premises;

a means for transmitting "of interest" information to the detected information providers;

a means for aggregating the real time commodity relevant information;

a central commodity database storing a commodity relevant information generated in real time and the associated weighted scores; and an interface for providing the real time commodity relevant information from the central commodity database or the information providers detected in the target premises.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

DETAILED DESCRIPTION OF THE INVENTION

Before the present method, system and communication enablement are described, it is to be understood that this invention is not limited to the particular methodologies, and hardware and network described, as these may vary within the specification indicated. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. Further it is to be noted that the terms "consumer"; "customer"; "information seeker" and "user"" are interchangeably used for the purposes of the present disclosure. The disclosed embodiments are merely exemplary methods of the invention, which may be embodied in various forms.

To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the invention described heretofore, it in effect becomes a special purpose computer particular to the present invention. The necessary programming-related techniques are well known to those skilled in the art and thus are not further described herein for the sake of brevity.

Definitions and Interpretations:

The embodiments of the present invention relates to aspects of a mobile phone based communication system to update the current or instantaneous prices of the commodity with the help of individuals (carrying mobile phones) present in the market. The following definitions are adopted herein to facilitate illustration of the specific embodiments described in detail herein.

Commodity, for the purposes of the present application, refers to any article of commerce (goods or products) that can be freely sold or purchased freely within a market and may include grown, mined and processed commodities. The most commonly exchanged and traded commodity can refer to anything tangible or ephemeral in nature, broadly extending to, though not limiting to; oil and natural gas, electricity, metals, cattle, feed, wheat, corn, soybean, cocoa, coffee, sugar, gold, silver, platinum, copper, rubber, wool, cotton and so on so forth. It is presumable that the commodity exchanged has standardized quality standards which are well received and observed by all traders in the market of exchange.

The commodity, defined above, is traded using a mobile or a stationary communicating device such as cell phones; Personal Digital Assistant (PDA); pocketbook; laptop; desktop; or any other similar device to ascertain exact and instantaneous pricing and other relevant information of the commodity within a geographical boundary of target market.

The geographical boundary of the target premises, for the purposes of present invention, may be defined as any arbitrarily designated market area or any particular region or some combination or division. These target market areas remains predefined for a particular geography and their contours identified and stored in the local memory of the communication device selected.

Additionally, the commodity relevant information determined from a chosen target market, may include commodity pricing information and other related information such as name of the commodity; variety, type, quality of the commodity; subjective quality of the commodity; quantity to be traded; price per unit; vendor/trader details; date-time stamp on the commodity; latitude-longitude coordinates; image or video of the commodity and not limited to other such information.

The central commodity database includes information about the commodity, as received from the individuals present in the target premises. The database is dynamic and gets refreshed in real time to provide instantaneous information to the consumer. It is accessed from Internet or from remote users carrying mobile phone or other such communication device.

System Overview

In one embodiment, the present invention discloses a system and method that provides accurate and instantaneous commodity pricing and other relevant information with the help of individuals (carrying a communicating device and preferably a mobile phone) present in the market. In return of their participation in providing the current prices in the market they are rewarded with appropriate incentives. The presence of the individuals in the market is detected with the help of the knowledge of the location information of the mobile phone carried by him/her. The localization of the mobile phone can be however done with the available technologies like Global Positioning System or Triangulation of the base stations or any other similar known techniques. The current prices as provided by the individuals are based on the deals undertaken by the individuals in the market. These are hence updated in the central commodity database which can be queried from remote location using mobile phone or a remote computer over internet at an affordable price. The invention thus enables access to instantaneous commodity pricing information of any market from remote locations without actual volunteers deployed.

Figure 1:
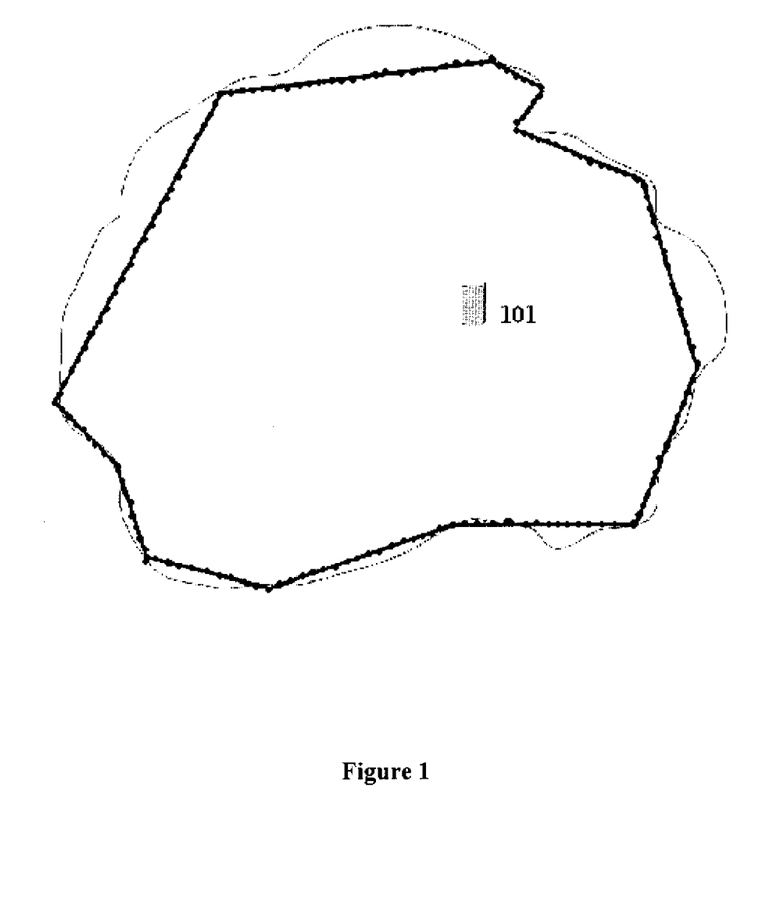
FIG. 1 is a representation of a contour of the target market approximated for storage in a communication media in accordance with one of the embodiments of the present invention.

FIG. 1 is a representation of a contour of the target market approximated for storage in a communication media in accordance with one of the embodiments of the present invention. The figure presents approximated contour of the market (shown as dotted line) as compared to the exact contour (shown by a plain line), which facilitates savings in memory requirement of the mobile for storing such information. The contours are mapped for detecting the presence of consumers/buyers 101 (carrying their mobile phones) in the target premises whenever they visit the target premises to buy/sell the commodity. The location of the consumers/buyers 101 is detected either by using a mobile phone application or a base station or a combination of both.

The presence detection of the consumer/buyer 101 by a mobile phone application involves the following steps:
  a) For each geography, the target premises is assumed to have been defined;
  b) The contour of each such target premises is proposed to be approximated by the set of straight lines as shown in the FIG. 1. Either the coordinates of the vertices or the coordinates of the line (slope and y intercept) are stored in the mobile phone local memory. These coordinates are either communicated from base station to the mobile phone or these can also be directly stored in the mobile phone along with the application based on the geography selected. The approximation of the contours minimizes the memory required to store the information in the mobile phone.
  c) The level of approximation of the contours depends on memory available in the mobile phone for storing as many coordinates. More is the available memory, accurate would be the approximation.
  d) Periodically, mobile localization application detects the present location of the mobile phone with the help of GPS, or Triangulation or by any other similar existing techniques.
  e) The final step is to detect the presence of the individual in the target premises with the help of exact location.

Another approach is the periodic detection of the presence of a mobile phone within certain premises with the help of application running at base station. Here the advantage is more accurate detection because Base station does not have memory constrain for storage of large number of coordinates of the piece-wise approximated contour.

It however has disadvantage of the excess communication. Periodically, mobile localization application detects the present location of the mobile phone with the help of GPS, or Triangulation or by any other similar existing techniques and communicates the location information to the base station. The base station further compares the location information with the contour stored to detect its presence in the market or in the said premise. As and when presence has been detected, it is further required to be communicating from base station to the mobile phone.

Figure 2:
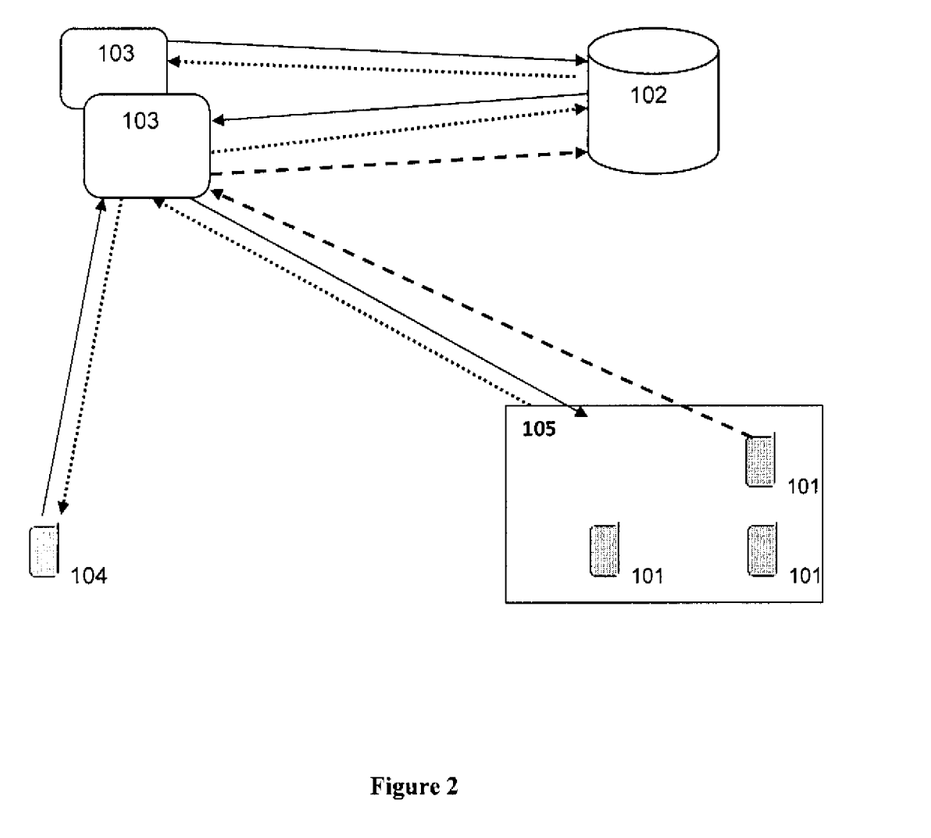
FIG. 2 illustrates a query based participation of individuals present in the target market for commodity relevant information.

FIG. 2 illustrates a query based participation of individuals present in the target market 105 for commodity relevant information over a communicating network. The communicating network over which the embodiments of the present invention gets implemented includes one or more computing devices (including mobile phones, PDA's, desktops, laptops, notebooks, touch screen pads etc) held by individuals 101 present in the target premises 105, connected to a central commodity database 102 through one or more networks such as Internet or mobile carrier network 103. As soon as the application/BS detects the presence of the individual 101 carrying mobile phone in the target premises 105, a mobile phone application is triggered which prompts the participation of the individual in collection of the current/instantaneous market prices and in return provide them with some incentives.

Referring again to FIG. 2, a central commodity database 102 is maintained and connectivity to mobile network 103 and the internet is established. This controls the complete flow of information along with information processing and handles all tasks related to commodity pricing query (shown as continuous arrows) and responses (shown as dotted arrows). The presence of individuals 101 detected in the target premises 105 are queried for certain commodity or they voluntarily update the prices (shown as dashed arrows) or the prices are updated through the electronic transactions. It shall be understood that the user can query for any commodity using various methods; say, for example, the consumer may send an SMS or any other messaging scheme facilitated by the computing device owned by him. The query (shown as continuous arrows) instigated may include commodity codes or ID, name, bar code, or other such information important for its identification. Various other existing and alternative methods as acknowledged by the people skilled in the art, forms the part of this invention and are not considered beyond its scope.

Alternatively any user 104 at remote location from the target premises 105 can pose a query (shown as continuous arrows) about certain market commodity to the mobile network 103 which is connected to the central commodity database 102. The base station then queries to the central commodity database 102 for the requested information. The database 102 on receiving the query logs the query as a command; identifies the relevant commodity and related details; and retrieves threshold values and associated price levels related to the queried commodity in response (shown as dotted arrows). The existing information stored in the database 102 gets refreshed with new data entries on intermittent basis—in every few minutes, hours, days or weeks.

The central commodity database 102 of the present invention is preferably a relational database, comprising of plurality of tables, the tables containing multiple columns to link with other tables for sharing information between these tables. It will be understood, however, that the number of tables, specific tables shown, data in the tables, and the relation between the tables may vary depending on the particular embodiment, without departing from the scope of the present disclosure. For example, a table designated to provide commodity information typically includes commodity codes, its ID, name and other identifying description. This table may be inter-linked with a table containing the details of the individual 101 who shall be providing the commodity relevant information to the user 104.

The threshold values are determined for various commodity parameters at frequent intervals and may assume any absolute or variance type of values. These values most often are defined by various external factors like weather information, traffic details, location—suburbs, major cities etc; population, local taxes and the like. For example, the price levels are assumed to be higher in the summers as compared to winters. Similarly the commodity prices are low in suburbs when compared with major cities. Based on these factors, the threshold values are assigned to various commodity parameters before the query from the user is received.

Next, the comparison is made between the predetermined threshold value and the prices queried for the relevant commodity, based on which the final commodity prices and other related information is provided to the user 104. If multiple price values exceed the predefined threshold value, then the one which has exceeded the threshold value by the highest order shall be communicated to the user 104. If the instantaneous requested information has been already fetched in the database 102, the same information can reverse flow to the mobile phone via base station.

However, if the information is not present in the database 102, the query is forwarded to the individuals 101 detected in the market with the present query by offering certain incentives. The information provided from the current transaction or by participative users reverses flows to the remote user 104 who has raised the query via central commodity database 102 and mobile network 103.

In one of the exemplary embodiments of the present invention, if an individual 101 carrying the mobile device is found to be in the target premises 105, the application tracks the duration for which one he/she is found in the premises 105. Based upon this duration the pricing details are requested depending upon this duration. The system 100 restrains from asking question to the individual's mobile phone that are there in the premises for long time or who are very frequently found in the target premises 105. This removes the possibility of asking directly to the vendor in order to keep the information actual and accurate. Other similar measures could be applied to guarantee the correctness of the information fetched. For instance individuals 101 with track record of correct information would get priority and more incentives. The reputation of the individuals for participating in the information providing can hence be built over time.

The other preferred embodiment of the present invention requires the information gathering application to be installed on the mobile phone of the individuals 101 present in the target premises 105. In this case, the application detects the presence in the market as soon as the carrier of mobile phone enters the target premises 105 and prompts the individual 101 to collect and submit the pricing information. The proposed mobile phone application is user friendly and also relies on natural language processing which overcomes requirement of the data entry to a large extent.

Per contra, for the individuals 101 detected to be present in the market but not having the proposed information gathering application installed on their mobile phones; the base station detects the presence of individual(s) 101 in the premises 105 and prompts them to participate in the collection of market prices in lieu of certain benefit. The base station may also ask them to download the application if they are regular visitor of the target premises 105.

In one other preferred embodiment, the electronics transaction system is linked with central commodity database 102. In this case, the prices are updated automatically in the central commodity database 102 when the payment is made through any electronic transaction system. This requires entry of few more details such as commodity, variety, quantity purchase while making the payment. This is also applicable for mobile phone based transaction system.

The pricing information can be aggregated if more number of individuals 101 participates in providing information of price for the same commodity over some time duration. The prices for any market and for the said commodity can hence be averaged over an hour, over N hours or over a day or over any time duration.

BEST MODE/EXAMPLE OF WORKING OF THE INVENTION

Figure 3:
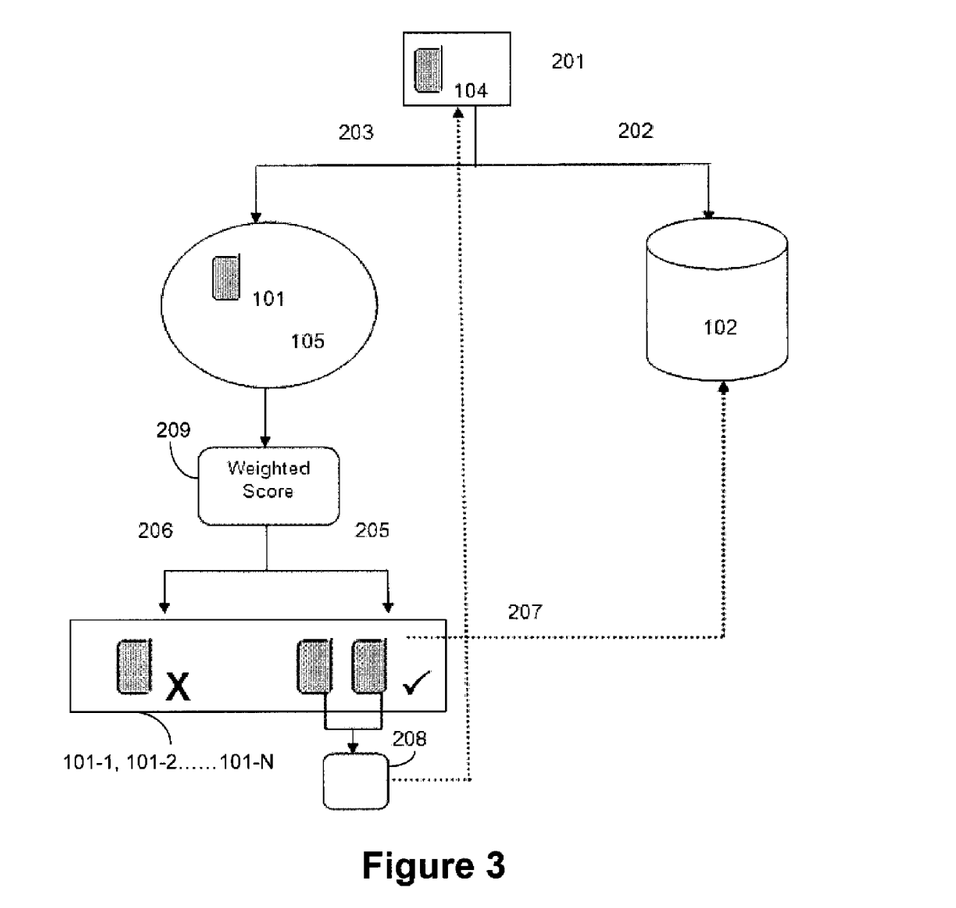
FIG. 3 is a block diagram illustrating retrieval of real time commodity relevant information in accordance with one of the exemplary embodiments of the present invention.

FIG. 3 is an illustration of providing real time commodity relevant information according to one of the preferred embodiments of the present invention. The query about prices in a certain premises can be requested by any user 104 at remote location using a mobile phone application or mobile web or any computer over Internet, as shown in step 201. This query is immediately resolved if the current information is already available in the database 102, as shown in step 202. Otherwise, this query is forwarded to the individuals 101 detected in the market for answering, as shown in step 203. In either case, the latter case, the flow of credit from a person who is querying to a person who responds to the query or has provided this information has been proposed in the present invention.

The user 104 may request for the exact prices after the detection of individual 101 in target premises 105 and announce the credit that he/she can provide, as shown in step 201. For example: The user may pay $X provided he get exact price of Commodity C in Market M, shown in step 201. The amount provided for response may be fixed or variable depending upon the application design requirement.

The system 100 divides these incentives amongst the selected individuals present and ready to respond to this query from the market 105. Individuals 101 already in the market 105 may then be willing to answer the query immediately if they are ready for the mentioned credit. The fetched information is then aggregated (shown in step 208) before communicating back to the queried user 104 on a suitable interface. The aggregated information is more reliable because it consolidates information from multiple individuals in the market. A business model can be designed in which some credits can also be reserved for the profit and the maintenance of the system. A user 104 at remote location can hence query for the following information, but not limited to, using mobile phone.

As shown in step 203 of FIG. 3, the user 104 at the remote location can query the individuals 101-1, 101-2 . . . 101-N present in the market, based on: particular market premises, rating of the varieties, mean price, maximum price, minimum price, qualitative aspects of the commodity; highest quantity commodity pricing, recent most deal pricing and so on so forth. The information can be sought even for the previous day or of any other day. The table below indicates data that can be provided to the remote user 104 who has queried for prices of a particular commodity.

|  |  | Number of Samples; average rating from users | Mean Price (Today) $per tonne | Minimum Price $per tonne | Minimum. Price Time; Location; vendor |
|---|---|---|---|---|---|
| Commodity Name | Variety 1 | 4; *** | 56 | 50 | 12:05; Location; Vendor |
|  | Variety 2 | 2; *** | 45 | 41 | 12:56; Location; Vendor |
|  | Variety 3 | 3; ****½ | 78 | 56 | 11:50; Location; Vendor |
|  | Variety 4 | 1; ** | 78 | 67 | 15:00; Location; Vendor |

The user 104 can then provide a weighted score 209 associated to every individual 101 of the individuals 101-1, 101-2 . . . 101-N for providing the information, as shown in step 247. The weighted score 209 is actually associated to every individual-commodity-market tuple. The associated weight directly relates to the accuracy of the information for that particular tuple. The incentives provided to an individual 101 are hence dependent on this weight, such that higher incentives can be provided for tuple with larger weights (shown in step 205). This provides feedback system to motivate the individuals to provide more and more accurate information. The profile data of individuals who are recognized to provide accurate information is maintained in the central commodity database 102, such that these individuals are queried at first stance based on their reputation. This is shown in step 207 of FIG. 3. The profile data of individuals is governed by several factors that may include: number of responses generated, duration of his presence in the target premises 105, assigned weighted score and other related factors.

The weight associated to the tuple (individual-commodity-market) is varied based on the accuracy of aggregated information from other individuals, electronics transaction details from other individuals, and from information seekers who then visit the market and provide feedback on the information provided by the system.

For individuals with very poor weighted scores (below a predetermined threshold value), information is not used for the present request of information. However, they are still queried for the improvement of their accuracies, which might be useful for the future request of pricing information. Further, individuals continuously sending false information are eventually withdrawn from the loop when there is no further improvement in accuracy after some fixed number of iterations, shown step 206.

The specification has described a system and method suitable for providing real-time pricing information for products. The foregoing description of the exemplary embodiments has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the systems and their practical application to enable others skilled in the art to utilize the systems and various embodiments and with various modifications as are suited to the particular use contemplated. Alternative embodiments will become apparent to those skilled in the art to which the present disclosure pertains without departing from their spirit and scope. Accordingly, the scope of the present inventions is defined by the appended claims rather than the foregoing description and the exemplary embodiments described therein.

The invention claimed is:

1. A computer implemented method for providing real time commodity relevant information over a network, the network communicating with a central commodity database, the method comprising:
  detecting, by a processor, one or more consumers present in one or more target premises by determining location of the at least one communicating device of the one or more consumers using a global positioning system and by triangulation of base stations, wherein the one or more target premises are predefined by a plurality of contour coordinates:
  transmitting, by the processor, an interest information to the detected one or more consumers for communicating the real time commodity relevant information by the at least one communicating device of the one or more consumers over the communicating network;
  receiving, by the processor, from the at least one communicating device of the one or more consumers the real time commodity relevant information;
  aggregating, via the processor, the real time commodity relevant information from the one or more consumers detected in the one or more target premises, each of the one or more target premises having a pre-defined contour;
  generating a mapped, approximated contour based upon approximation of the pre-defined contour by a set of lines, wherein coordinates, of the set lines, including slope and y intercepts represent the mapped, approximated contour, wherein the coordinates are store in a memory of at least one communicating device of the one or more consumers,
  wherein generating the mapped, approximated contour minimizes the memory required to store a representation of the pre-defined contour in the at least one communicating device of the one or more consumers, wherein a level of approximation of the predefined contour is dependent upon a memory space available in the at least one communicating device of the one or more consumers, wherein the one or more consumers detected are involved in a real time deal associated with a commodity in the one or more target premises, and wherein the one or more consumers are detected based on a presence of the at least one communicating device of the one or more consumers within the mapped, approximated contour;

assigning, via the processor, a weighted score to an individual commodity-market tuple comprising the one or more consumers detected, the real time commodity relevant information, and the one or more target premises, wherein the individual-commodity-market tuple is associated with the commodity relevant information received from the one or more consumers, wherein a weight associated to the individual-commodity-market tuple is varied based on an accuracy of aggregated information;

maintaining and updating the central commodity database comprising profile data of one or more consumers and the weighted score of the corresponding individual-commodity-market tuple;

querying the central commodity database of the real time commodity relevant information based on the profile data of the one or more consumers, wherein said querying includes improving accuracies for a future request of a pricing information; and providing the real time commodity relevant information to one or more seekers from the central commodity database based on a comparison between the weighted score and a threshold value.

2. The method of claim 1, further comprising establishing a link between the central commodity database and an electronic transaction system over a communicating network and automatically updating the central commodity database whenever a payment is made through the electronic transaction system.

3. The method of claim 1, wherein the updating of the central commodity database requires details associated with the real time commodity relevant information, and wherein the details comprise at least one of: commodity details, variety, quantity, commodity prices, vendor details, date, time, and location.

4. The method of claim 1, wherein the profile data of the one or more consumers is determined on a number of responses generated, duration of presence in the one or more target premises and not limited to the weighted score.

5. The method of claim 1, further comprising forwarding of a query to the one or more consumers present in the one or more target premises when the real time commodity relevant information is not supported by the central commodity database.

6. The method of claim 1, wherein the weighted score assigned to the individual-commodity-market tuple is dependent on a duration of stay of the one or more consumers in the one or more target premises.

7. The method of claim 1, wherein the real time commodity relevant information is provided corresponding to an individual-commodity-market tuple having a maximum weighted score, and wherein the maximum score is determined based on the comparison of the weighted score and the threshold value.

8. The method of claim 1, wherein the detection of one or more consumers is enabled using at least one of: Global positioning system (GPS), triangulation of base stations, and a consumer supplied input.

9. The method of claim 1, wherein the central commodity database is queried by instigating a query, and wherein the query instigated includes a commodity code, a commodity identifier (ID), and a bar code.

10. The method of claim 9 further comprising:
identifying a relevant commodity and related details thereof based upon the query instigated; and
retrieving threshold values and associated price levels related to the relevant commodity.

11. The method of claim 10 further comprising:
comparing the associated price levels and the threshold values; and
providing final commodity prices and related information thereof, wherein the final commodity prices correspond to price levels exceeding the threshold values by highest order.

12. The method of claim 1, wherein the central commodity database comprises a table designated to provide the commodity information, wherein the commodity information includes commodity codes, commodity Identifiers (IDs), and bar codes.

13. The method of claim 12, wherein the table is interlinked with at least one other table via the columns of the table, and wherein the at least one other table comprises details of at least one consumer providing the commodity information.

14. A computer implemented system for providing real time commodity relevant information over a communicating network, the communicating network communicating with a central commodity database, the system comprising:
a processor; and
a memory unit coupled to the processor, wherein the processor executes programmed instructions stored in the memory unit in order to:
detect one or more consumers present in one or more target premises by determining location of at least one communicating device of the one or more consumers using a global positioning system and by triangulation of base stations, wherein the one or more target premises are predefined by a plurality of contour coordinates;
transmit an interest information to the detected information providers one or more consumers for communicating the real time commodity relevant information by the at least one communicating device of the one or more consumers over the communicating network;
receive, from the at least one communicating device of the one or more consumers, the real time commodity relevant information;
aggregate the real time commodity relevant information from the one or more consumers detected in the one or more target premises, each of the one or more target premises having a pre-defined contour;
generate a mapped, approximated contour based on approximation of the predefined contour by a set of lines, wherein coordinates of the set of lines including slope and Y-intercept represent the mapped, approximated contour, wherein the coordinates are stored in a memory of the at least one communicating device of the one or more consumers;
wherein the generated mapped, approximated contour minimizes the memory of the at least one communicating device of the one or more consumers required to store a representation of the predefined contour in the at least one communicating device of the one or more consumers, wherein a level of approximation of the predefined contour is dependent upon on a memory space available in the at least one communicating device of the one or more consumers;

wherein the one or more consumers detected are involved in a real time deal associated with a commodity in the one or more target premises, wherein the one or more consumers are detected based on a presence of the at least one communicating device of the one or more consumers within the mapped, approximated contour assign a weighted score to an individual-commodity market tuple comprising the one or more consumers detected, the real time commodity relevant information, and the one or more target premises, wherein the individual-commodity market tuple is associated with the commodity relevant information received from the one or more consumers, wherein a weight associated to the individual-commodity market tuple is varied based on an accuracy of aggregated information;

maintain and update the central commodity database comprising profile data of the one or more consumers and the weighted score of the corresponding individual-commodity market tuple;

query the central commodity database of the real time commodity relevant information based on the profile data of the one or more consumers, wherein said querying includes improving accuracies for a future request of a pricing information; and provide the real time commodity relevant information to one or more seekers from the central commodity database based on a comparison between the weighted score and a threshold value, wherein the threshold value is assigned to a plurality of commodity users prior to receiving a query from a user.

15. The system of claim 14, wherein the at least one communicating device includes at least one of: mobile devices, cellular telephones, laptop computers, and personal digital assistants.

16. The system of claim 14, wherein the at least one communicating device employs at least one of a Global positioning system (GPS), and triangulation of base stations associated with the at least one communicating device.

17. The system of claim 14, wherein the central commodity database further enables capturing the profile data of the one or more consumers from a number of responses generated, duration of presence in the one or more target premises and not limited to the weighted scores.

18. The system of claim 14, wherein the one or more consumers present in the one or more target premises are requested for providing information when the real time commodity relevant information is not supported by the central commodity database.

* * * * *